B. E. MILLARD & F. B. TAYLOR.
SPRAYING NOZZLE.
APPLICATION FILED NOV. 3, 1916.
1,276,245.
Patented Aug. 20, 1918.
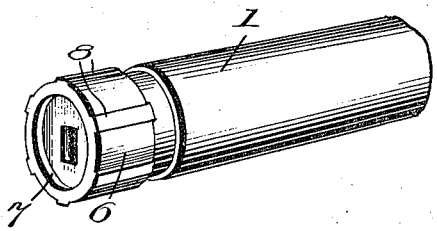
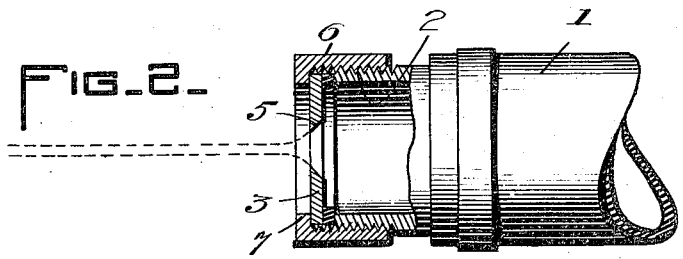
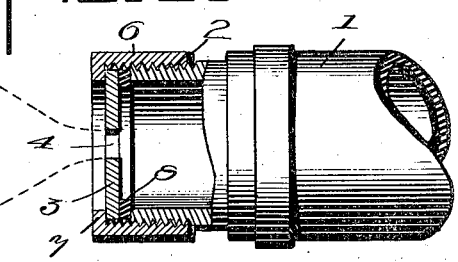
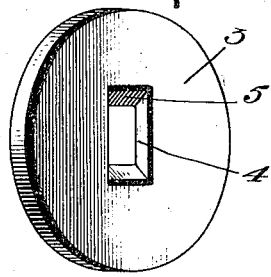
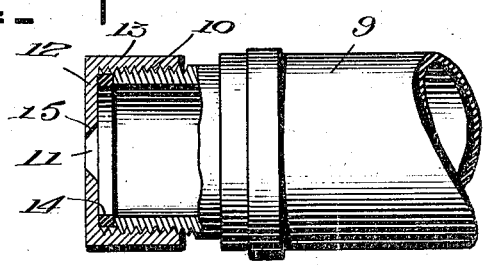
WITNESSES
INVENTORS
BRUCE E. MILLARD,
FRANK B. TAYLOR
BY
ATTORNEYS

UNITED STATES PATENT OFFICE.

BRUCE E. MILLARD AND FRANK B. TAYLOR, OF SAN DIEGO, CALIFORNIA, ASSIGNORS OF ONE-HALF TO GILMOUR SHARP, OF SAN DIEGO, CALIFORNIA.

SPRAYING-NOZZLE.

1,276,245.  Specification of Letters Patent.  Patented Aug. 20, 1918.

Application filed November 3, 1916. Serial No. 129,322.

*To all whom it may concern:*

Be it known that we, BRUCE E. MILLARD and FRANK B. TAYLOR, citizens of the United States, and residents of San Diego, in the county of San Diego and State of California, have invented a certain new and useful Improvement in Spraying-Nozzles, of which the following is a specification.

Our invention is an improvement in spraying nozzles, and has for its object to provide a cheap, efficient nozzle of the character specified which will break up the water into fine particles and deliver it in a widespread spray.

In the drawings:

Figure 1 is a perspective view of the improved nozzle;

Fig. 2 is a side view with parts in section;

Fig. 3 is a similar view of a section at right angles to Fig. 2;

Fig. 4 is a perspective view of the spray nozzle or head, and

Fig. 5 is a side view with parts in section.

In the embodiment of the invention shown in Fig. 4, the improved nozzle is shown in connection with a pipe section 1 having its end externally threaded, as shown at 2. The nozzle is in the form of a disk 3 having a slot or opening 4 at the center thereof, the said slot or opening being rectangular and having its end walls beveled inwardly, as indicated at 5, in such manner that the outer end of the opening is of less cross section than the inner end.

This disk 3 is held against the end of the pipe 2 by means of a ring 6, the said ring being threaded onto the threaded portion 2 of the pipe section, and having a marginal inwardly extending flange 7 at its outer end engaging over the edge of the disk.

A packing ring 8 is arranged between the disk and the end of the pipe section 1 for hermetically sealing the space between the two, and the exterior of the ring is provided with longitudinally extending ribs 9 for engagement by a tool or the like for convenience in turning the same.

In operation, with the disk in place, a fan-shaped stream of water will be thrown, as shown in Fig. 2, the beveled end of the opening causing the water to converge as indicated in dotted lines in Fig. 2, while the water will naturally diverge between the side walls of the opening, as shown in dotted lines in Fig. 3.

In the embodiment of the invention shown in Fig. 5, the pipe section 9 has a threaded end 10 and a spray opening 11 is arranged within the disk 12, having a marginal flange 13 threaded onto the reduced portion 11. A packing ring 14 is arranged between the disk and the end of the pipe section, and the opening 11 has its end walls beveled as indicated at 15.

We claim:—

A spraying nozzle comprising a disk having a substantially rectangular opening extending from one face thereof to the other, and arranged diametrically thereof, the said opening having its end walls inclined and converging toward the outer face of the disk and having its side walls approximately parallel, means for connecting the disk to the end of a pipe, and a packing in connection with the said means, said means comprising a ring having threaded engagement with the pipe and having an inwardly extending flange engaging the edge of the disk to hold the disk in place.

BRUCE E. MILLARD.
FRANK B. TAYLOR.

Witnesses:
THOMAS E. BENNETT,
IRA CARROLL.